United States Patent
Tsai

(10) Patent No.: US 7,224,990 B2
(45) Date of Patent: May 29, 2007

(54) METHOD FOR TRANSFERRING A MESSAGE IN A PREDETERMINED SENDING TIME AND RELATED COMMUNICATION SYSTEM THEREOF

(75) Inventor: Chia-Hung Tsai, Taipei Hsien (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 18 days.

(21) Appl. No.: 11/161,763

(22) Filed: Aug. 16, 2005

(65) Prior Publication Data

US 2007/0042793 A1  Feb. 22, 2007

(51) Int. Cl.
*H04Q 7/20* (2006.01)
(52) U.S. Cl. ...................................................... 455/466
(58) Field of Classification Search ................ 455/466, 455/412.1, 458, 556.2
See application file for complete search history.

(56) References Cited

U.S. PATENT DOCUMENTS

| | | | |
|---|---|---|---|
| 7,107,042 B1* | 9/2006 | Jordan, Jr. ................ | 455/412.1 |
| 2004/0203957 A1* | 10/2004 | George ....................... | 455/466 |
| 2005/0170856 A1* | 8/2005 | Keyani et al. .............. | 455/466 |
| 2006/0211434 A1* | 9/2006 | Islam et al. ................. | 455/466 |

\* cited by examiner

*Primary Examiner*—Barry Taylor
(74) *Attorney, Agent, or Firm*—Winston Hsu

(57) ABSTRACT

A method for transferring a message from a first portable electronic device to a second portable electronic device through a server is disclosed. The method includes: utilizing the first portable electronic device to add a relay information to the message and then delivering the message to the server; utilizing the server to read the relay information from the message to determine a predetermined sending time for the message; and utilizing the server to send the message to the second portable electronic device at the predetermined sending time.

16 Claims, 6 Drawing Sheets

METHOD FOR TRANSFERRING A MESSAGE IN A PREDETERMINED SENDING TIME AND RELATED COMMUNICATION SYSTEM THEREOF

BACKGROUND OF THE INVENTION

1. Field of the Invention

The invention relates to a method for transferring a message and related communication system thereof, and more particularly, to a method for transferring a message in a predetermined sending time and related communication system thereof.

2. Description of the Prior Art

Cell phones have become an essential electronic device in today's modern life. Communication can occur anytime and any place through the use of cell phones. Cell phones have dual uses, not only acting as normal telephones but also enabling messages to be sent between two cells. Nowadays, even e-mail can be transferred from one cell phone to another. This provides users with many communication choices.

Please refer to FIG. 1, which is a flow chart of a prior art process of sending a message from a first cell phone to a second cell phone. It comprises the following steps:

Step 100: The first cell phone prepares a message to be sent to the second cell phone.

Step 102: The first cell phone transfers the message to a service center.

Step 104: After the service center receives the message, the service center reads information from the message.

Step 106: The service center forwards the message to the second cell phone.

First of all, the first cell phone prepares a message (Step 100). As known by those skilled in the art, the message has to comprise information of destination (in this case, the destination is the second cell phone), the current time, and the data to be sent to the second cell phone.

As mentioned above, a message comprises certain information. Please refer to FIG. 2, which is a simplified diagram of a message according to the prior art. For the purposes of simple illustration, FIG. 2 only shows a part of the message. As shown in FIG. 2, the message comprises different parts. The first part of the message is called a transmission-protocol-first-octet (TP-FO). Another part of the message is called a transmission-protocol-validity-period (TP-VP). The last part of the message is the data as defined by the users.

Please note that the TP-VP part stores information of four different formats, which are: TP-VP not present format, TP-VP related format, TP-VP enhanced format, and TP-VP absolute format. The TP-VP absolute format in particular contains information regarding the absolute time, including seconds, minutes, dates, months, years, and the current time zone. Moreover, the TP-FO part is an 8-bit information, where two bits are utilized to tell the service center which format the information stored inside the TP-VP is.

Please refer to FIG. 1 again, where the first cell phone transfers the prepared message to a service center. Please note that the service center is provided by a telecom service provider. The service center can be regarded as a server, which works for forwarding messages (Step 102).

The service center (the server) receives the message, and reads the information, including the data, the current time, and the destination information, from the message (Step 104). Therefore, the service center can know where the message should be sent, and is then able to immediately forward the message to the second cell phone (Step 106).

In some instances, the message may not be transferred to the second cell phone successfully. For example, if the second cell phone is not turned on or has insufficient storage space to store the message, the message cannot be sent to the second cell phone. Therefore, the service center often comprises a report mechanism to tell the user of the first cell phone whether the message has been successfully transferred or not. Furthermore, in order to prevent from trying to send the message to an unavailable destination too many times, the service center also has a timeout mechanism. For example, the service center can only try to send the message in a predetermined time period. Through using the two above-mentioned mechanisms, the user is able to know whether the message has been transferred successfully or not.

The above-mentioned process of transferring a message has a problem, however. That is, the user cannot input a predetermined sending time to send the message. For example, the user may have to go to a place where the cell phone cannot be utilized, but still wishes to send a message to people at that time. The user may wish to send a message for a special occasion, such as a "Happy Birthday" message, but wants to arrange in advance the time the message should be sent. Therefore, if the above-mentioned process can support the mechanism of sending messages in a predetermined timing, the functions of cell phones and associated services can be more complete.

SUMMARY OF THE INVENTION

It is therefore one of the primary objectives of the claimed invention to provide a method for transferring a message, and related communication system thereof, to solve the above-mentioned problem.

According to an exemplary embodiment of the claimed invention, a method for transferring a message from a first portable electronic device to a second portable electronic device through a server is disclosed. The method comprises: utilizing the first portable electronic device to add a relay information to the message and then delivering the message to the server; utilizing the server to read the relay information from the message to determine a predetermined sending time for the message; and, when the predetermined sending time has been reached, utilizing the server to send the message to the second portable electronic device.

According to another exemplary embodiment of the claimed invention, a communication system is disclosed. The communication system comprises: a first portable electronic device, a second electronic device, and a server. The first portable electronic device comprises: a first storage device for storing a first program; and a first processor, coupled to the first storage device, for executing the first program to add a relay information to a message and then controlling the first portable electronic device to deliver the message. The server is utilized for receiving the message outputted from the first portable electronic device, where the server comprises: a second storage device for storing a second program; and a second processor, coupled to the second storage device, for executing the second program to read the relay information from the message to determine a predetermined sending time for the message, and for controlling the server to send the message to the second portable electronic device at the predetermined sending time.

The present invention can allow users to determine a sending time so that the message can be sent to another cell phone at the sending time, which is determined by the user.

In other words, the present invention cell phone provides a new function, and the user can utilize the cell phone more conveniently.

These and other objectives of the present invention will no doubt become obvious to those of ordinary skill in the art after reading the following detailed description of the preferred embodiment that is illustrated in the various figures and drawings.

DETAILED DESCRIPTION

For the user to utilize the cell phone conveniently, the present invention provides a new mechanism to allow the user to determine a predetermined sending time so that the service center can send the message at the predetermined sending time.

In order to provide the new mechanism, the present invention performs certain changes on the above-mentioned message specification so that the service center can know when the message has to be sent. In the following disclosure, the present invention provides two methods to add the information of the predetermined sending time.

Figure 1:
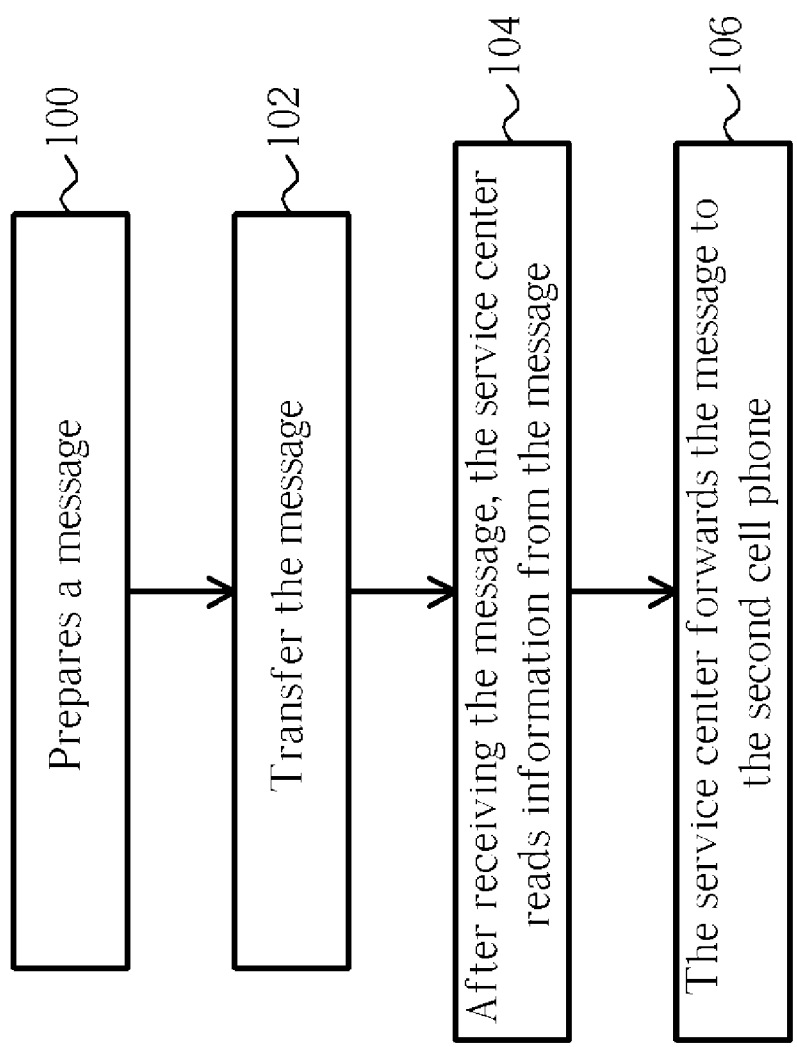
FIG. 1 is a flow chart of sending a message from a first cell phone to a second cell phone according to the prior art.
Figure 2:
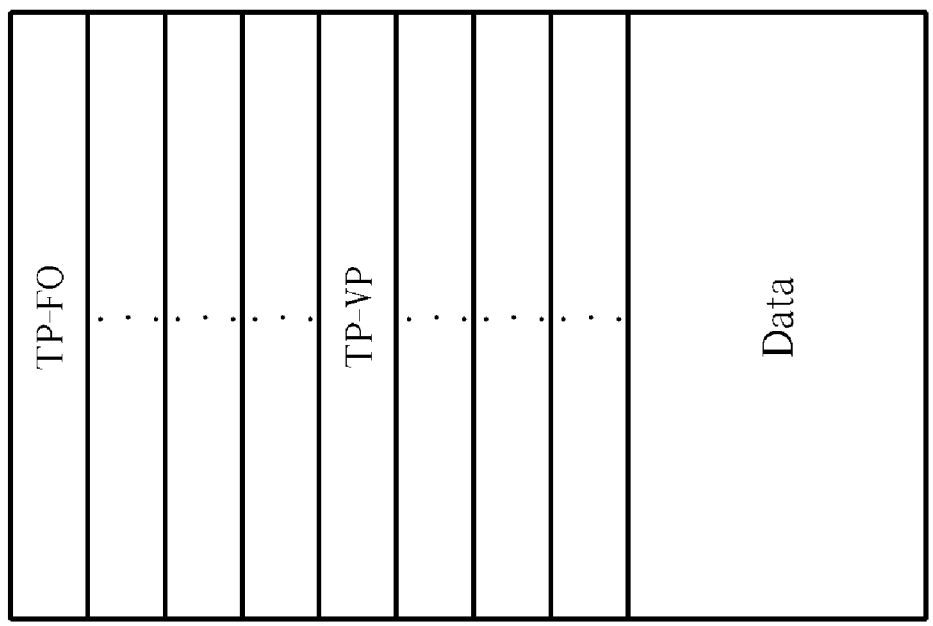
FIG. 2 is a simplified diagram of a message according to the prior art.
Figure 3:
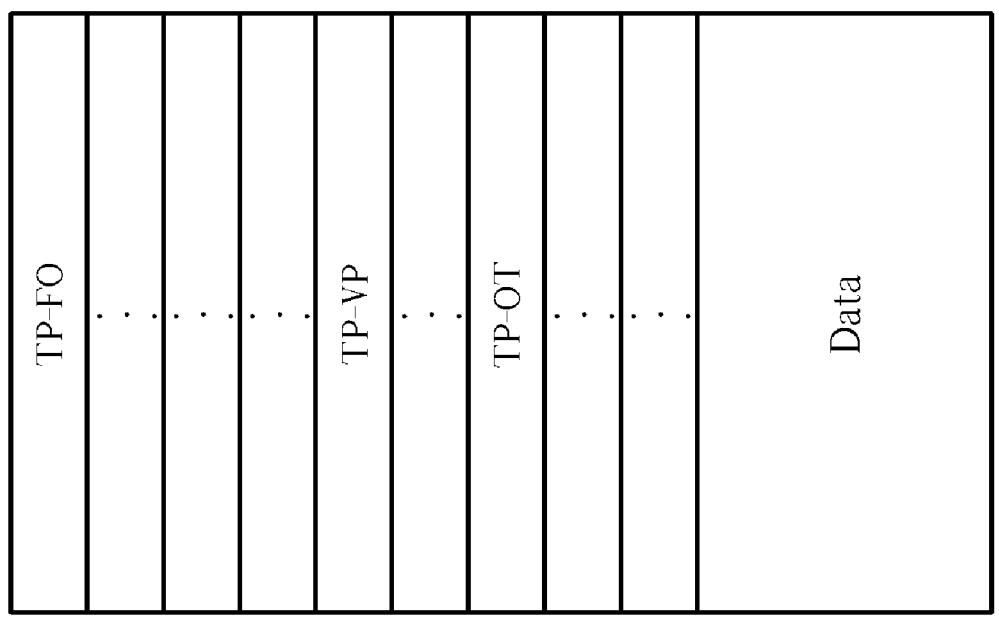
FIG. 3 is a diagram of a message of a first embodiment according to the present invention.

Please refer to FIG. 3, which is a diagram of a message of a first embodiment according to the present invention. As shown in FIG. 3, besides the parts mentioned above, the present invention adds an additional part TP-OT (transmission-protocol-order-time) to represent the predetermined sending time. Therefore, after the message has been transferred to the service center, the service center can obtain the information of the predetermined sending time, and send the message to the destination cell phone at the predetermined sending time according to the information.

Figure 4:
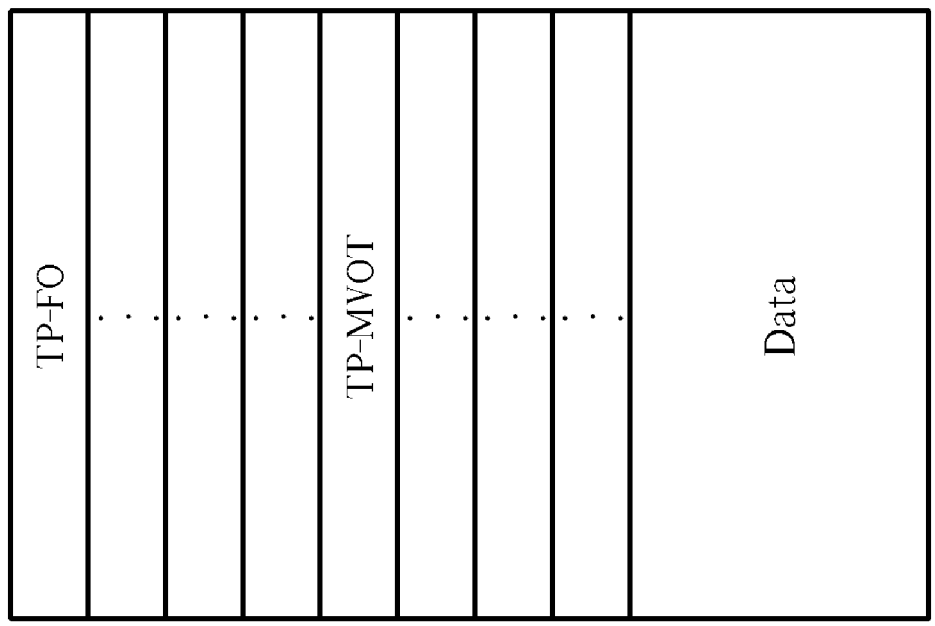
FIG. 4 is a diagram of a message of a second embodiment according to the present invention.

Please refer to FIG. 4, which is a diagram of a message of a second embodiment according to the present invention. As shown in FIG. 4, in this embodiment, there is no additional part in this message. Instead, the original part TP-VP is replaced by a new information TP-MVOT, which is a combination of the original information TP-VP and the information TP-OT. In other words, the information of the predetermined sending time is put inside the information of the current time.

Combining the information is simple. Here, the present invention encodes the information of predetermined sending time and the information of the current time through using two orthogonal codes. In other words, the information of predetermined sending time is multiplied by one of the orthogonal codes, the information of the current time is multiplied by the other orthogonal code, and the two pieces of multiplied information are added to each other in order to generate the combined information TP-MVOT. Similarly, after the service center receives the message, the service center can utilize the two orthogonal codes to decode the combined information TP-MVOT in order to extract the two original pieces of information TP-VP and TP-OT. Therefore, the service center can send the message at the predetermined sending time.

Figure 5:
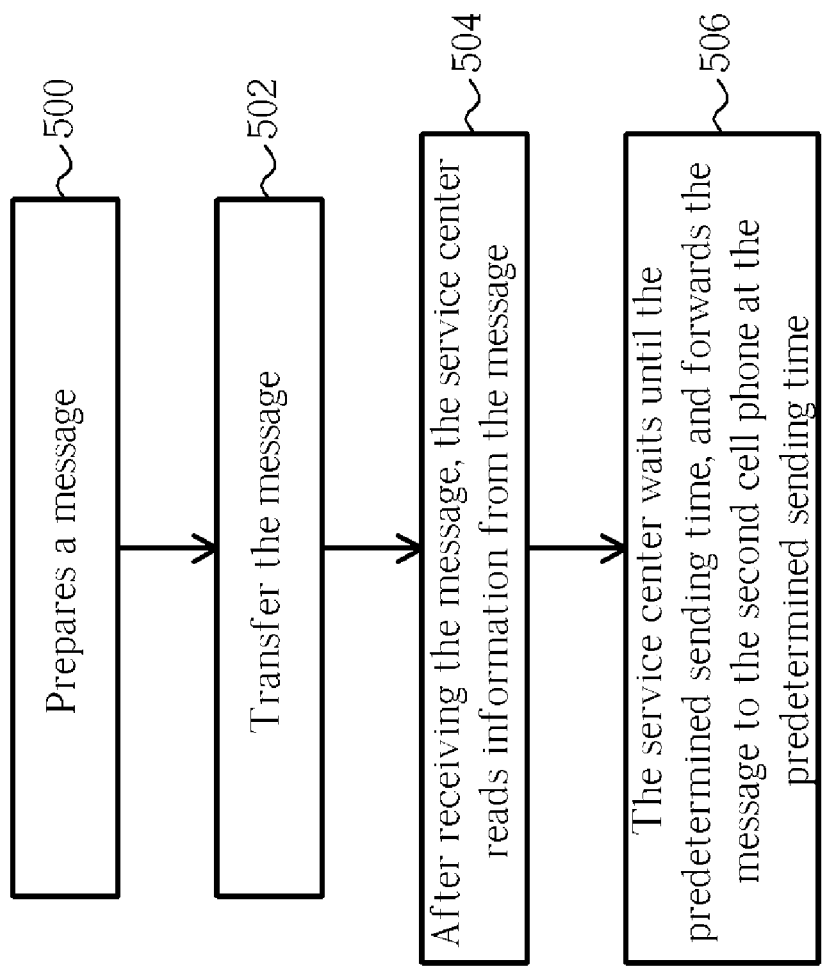
FIG. 5 is a flow chart of sending a message according to the present invention.

Please refer to FIG. 5, which is a flow chart of sending a message from a first cell phone to a second cell phone through a service center according to the present invention. The flow comprises the following steps:

Step 500: The first cell phone prepares a message, which is to be sent to the second cell phone.

Step 502: The first cell phone transfers the message to a service center.

Step 504: After the service center receives the message, the service center reads information from the message.

Step 506: The service center waits until the predetermined sending time, and forwards the message to the second cell phone at said predetermined sending time.

First, the first cell phone has to prepare the message to be sent to the second cell phone (Step 500). As mentioned above, the first cell phone can directly add the new information of the predetermined sending time as an additional part of the message. Alternatively, the first cell phone can utilize the two orthogonal codes to encode the information of the predetermined sending time and the information of the current time to generate the combined information, and store the combined information in the original place, which is originally utilized to store the information of the current time.

After the message has been prepared (this means that the message comprises the information of the predetermined sending time, the current time, the destination, and data), the first cell phone transfers the message to the service center (Step 502).

After the service center receives the message, the service center performs a predetermined operation to obtain the information stored in the message (Step 504). For example, if the information of the predetermined sending time is directly added as an additional part in step 500, the service center can directly extract the information of the predetermined sending time. If the information of the predetermined sending time is added through an encoding procedure, the service center has to utilize the two orthogonal codes to decode the combined information. Either way, the service center will know when the message has to be sent.

Finally, the service center waits until the predetermined sending time and forwards the message at said predetermined sending time (Step 506). The whole procedure of sending a message is complete.

As mentioned previously, the service center has report and timeout mechanisms for informing the user whether or not the message has been successfully transferred. Because the report and the timeout mechanisms have already been described, further description is omitted here.

Figure 6:
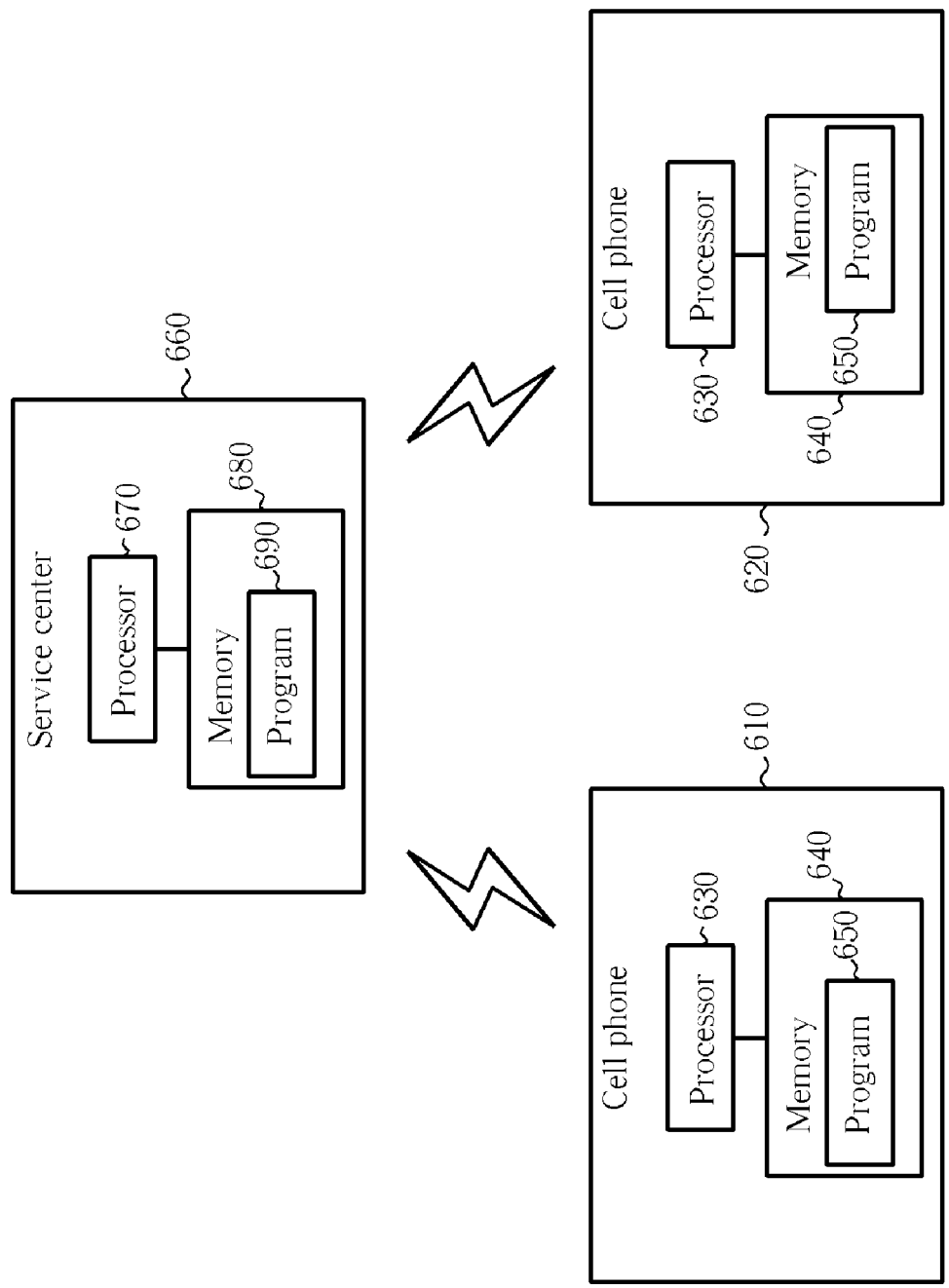
FIG. 6 is a diagram of a communication system according to the present invention.

Please refer to FIG. 6, which is a diagram of a communication system 600 according to the present invention. The communication system 600 comprises two cell phones 610 and 620, and a service center 660. The cell phone 610 and the cell phone 620 both comprise a processor 630 and a memory 640. The memory 640 stores a program 650. The service center 660 comprises a processor 670 and a memory 680, where the memory 680 stores a program 690.

Now refer to FIG. 5 in conjunction with FIG. 6. The steps detailed in FIG. 5 are performed by the devices illustrated in FIG. 6. For example, in step 500, the message has to be prepared. That is, the processor 630 of the cell phone 610 executes the program 650 stored in the memory 640 to prepare the message. The program 650 may comprise an adding program for adding the information of the predetermined sending time as an additional part. Alternatively, the program 650 may comprise the two orthogonal codes and the related encoded program for encoding the information of the predetermined sending time and the information of the current time.

Furthermore, in step 502, the processor 630 can control the cell phone 610 to send the message to the service center 660. In step 504, the processor 670 of the service center 660 executes the program 690 stored in the memory 680 to read the information from the message. The program may comprise the two orthogonal codes and the related decoding program for the service center 660 to extract the information of the predetermined sending time.

Therefore, in step 506, the processor 670 then controls the service center 660 to output the message to the cell phone 620 at the predetermined sending time.

In the above disclosure, the message is transferred from the cell phone 610 to cell phone 620, but the message can also be transferred from the cell phone 620 to the cell phone 610. This also obeys the spirit of the present invention.

Moreover, the two above-mentioned methods of adding the information of the predetermined sending time are only utilized as preferred embodiments, not limitations of the present invention. In other words, the present invention is not limited to utilizing the two orthogonal codes to encode the information. In fact the present invention can utilize other encoding mechanisms to add the information of predetermined sending time in the message. These other methods also obey the spirit of the present invention.

Furthermore, the present invention utilizes two cell phones for illustration purposes, not as a limitation of the present invention. In other words, all portable electronic devices that are capable of sending a message, not only cell phones, can be utilized. This also obeys the spirit of the present invention.

In contrast to the prior art, the present invention can allow users to determine a sending time so that a message can be sent to another cell phone at said determined sending time. In other words, the present invention cell phone provides a new function, and the user can utilize the cell phone more conveniently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for transferring a message from a first portable electronic device to a second portable electronic device through a server, the method comprising:
   utilizing the first portable electronic device to add a relay information to the message and then delivering the message to the server, wherein the message comprises information indicating the current time, and the step of adding the relay information to the message is performed by utilizing the first portable electronic device to store the relay information in a same block of the message as that used to store the current time;
   utilizing the server to read the relay information from the message to determine a predetermined sending time for the message; and
   utilizing the server to send the message to the second portable electronic device at the predetermined sending time.

2. The method of claim 1, wherein the step of adding the relay information to the information of the current time further comprises:
   utilizing two orthogonal codes to encode the information of the current time and the relay information, respectively.

3. The method of claim 2, wherein the step of reading the relay information from the message further comprises:
   utilizing the two orthogonal codes to decode the message to generate the information of the current time and the relay information, respectively.

4. The method of claim 1, wherein the information of the current time complies with a transfer protocol validity-period absolute format (TP-VP absolute format), utilized for representing the current time.

5. The method of claim 1, wherein the first and the second portable electronic devices are both cell phones.

6. The method of claim 1, wherein the server is a service center (SC).

7. A communication system comprising:
   a first portable electronic device comprising:
      a first storage device for storing a first program; and
      a first processor, coupled to the first storage device, for executing the first program to add a relay information to a message and then controlling the first portable electronic device to deliver the message, wherein the message comprises information indicating the current time, and the first processor stores the relay information in a same block of the message as that used to store the current time;
   a second portable electronic device; and
   a server for receiving the message outputted from the first portable electronic device, the server comprising:
      a second storage device for storing a second program; and
      a second processor, coupled to the second storage device, for executing the second program to read the relay information from the message to determine a predetermined sending time for the message, and for controlling the server to send the message to the second portable electronic device at the predetermined sending time.

8. The communication system of claim 7, wherein the first program further comprises two orthogonal codes, and the first processor executes the first program to utilize the two orthogonal codes to encode the information of the current time and the relay information, respectively.

9. The communication system of claim 8, wherein the second program further comprises the two orthogonal codes, and the second processor executes the second program to utilize the two orthogonal codes to decode the message to generate the information of the current time and the relay information, respectively.

10. The communication system of claim 7, wherein the information of the current time complies with a transfer protocol validity-period absolute format (TP-VP absolute format), utilized for representing the current time.

11. The communication system of claim 7, wherein the first and the second portable electronic devices are both cell phones.

12. The communication system of claim 7, wherein the server is a service center (SC).

13. A portable electronic device for delivering a message to a server, the portable electronic device comprising:
   a storage device for storing a program; and
   a processor, coupled to the storage device, for executing the program to add a relay information to the message and then controlling the portable electronic device to deliver the message, wherein the message comprises information indicating the current time, and the first processor stores the relay information in a same block of the message as that used to store the current time; wherein the server forwards the message according to the relay information.

14. The portable electronic device of claim 13, wherein the information of the current time complies with a transfer protocol validity-period absolute format (TP-VP absolute format), utilized for representing the current time.

15. The portable electronic device of claim 13 being a cell phone.

16. The portable electronic device of claim 13, wherein the server is a service center (SC).

* * * * *